(12) United States Patent
Lohier et al.

(10) Patent No.: US 8,384,820 B1
(45) Date of Patent: Feb. 26, 2013

(54) REAL TIME VIDEO FRAME MASKING AND PROCESSING FOR AUTO FOCUS AND OTHER QUALITY OPTIMIZATIONS

(75) Inventors: Frantz Lohier, El Cerrito, CA (US); Richard Nicolet, Menlo Park, CA (US)

(73) Assignee: Logitech Europe S.A., Morges (CH)

( * ) Notice: Subject to any disclaimer, the term of this patent is extended or adjusted under 35 U.S.C. 154(b) by 943 days.

(21) Appl. No.: 12/130,908

(22) Filed: May 30, 2008

(51) Int. Cl.
G03B 13/00 (2006.01)
(52) U.S. Cl. ........................................................ 348/349
(58) Field of Classification Search .................. 348/345, 348/349, 353–354
See application file for complete search history.

(56) References Cited

U.S. PATENT DOCUMENTS

| | | |
|---|---|---|
| 4,514,634 A | 4/1985 | Lawson |
| 4,738,526 A | 4/1988 | Larish |
| 4,855,838 A | 8/1989 | Jones et al. |
| 5,101,277 A | 3/1992 | Kanata |
| 5,200,828 A | 4/1993 | Jang et al. |
| 5,204,739 A | 4/1993 | Domenicali |
| 5,477,271 A | 12/1995 | Park |
| 5,512,951 A | 4/1996 | Torii |
| 6,100,881 A | 8/2000 | Gibbons et al. |
| 6,125,229 A | 9/2000 | Dimitrova et al. |
| 6,185,363 B1 | 2/2001 | Dimitrova et al. |
| 6,511,420 B1 | 1/2003 | Farrell et al. |
| 6,833,862 B1 | 12/2004 | Li |
| 6,944,700 B2 | 9/2005 | Bateman et al. |
| 6,995,794 B2 | 2/2006 | Hsu et al. |
| 2002/0030755 A1* | 3/2002 | Uchino .......................... 348/342 |
| 2006/0274170 A1* | 12/2006 | Azuma ........................... 348/246 |
| 2007/0011338 A1 | 1/2007 | Glatron et al. |
| 2007/0133971 A1* | 6/2007 | Itoh ............................... 396/106 |

* cited by examiner

*Primary Examiner* — W. B. Perkey
*Assistant Examiner* — Minh Phan
(74) *Attorney, Agent, or Firm* — Kilpatrick Townsend & Stockton LLP

(57) ABSTRACT

A system and method for optimizing a video stream from a high frame rate image sensor. The high frame rate video stream is split into two separate video streams so that one video stream can be shown to a user or recorded, while the other video stream can be processed. The processed video stream can be analyzed for sharpness to adjust for focus or it can be imaged with or without an optical filter and used to enhance the appearance of the other video stream.

20 Claims, 5 Drawing Sheets

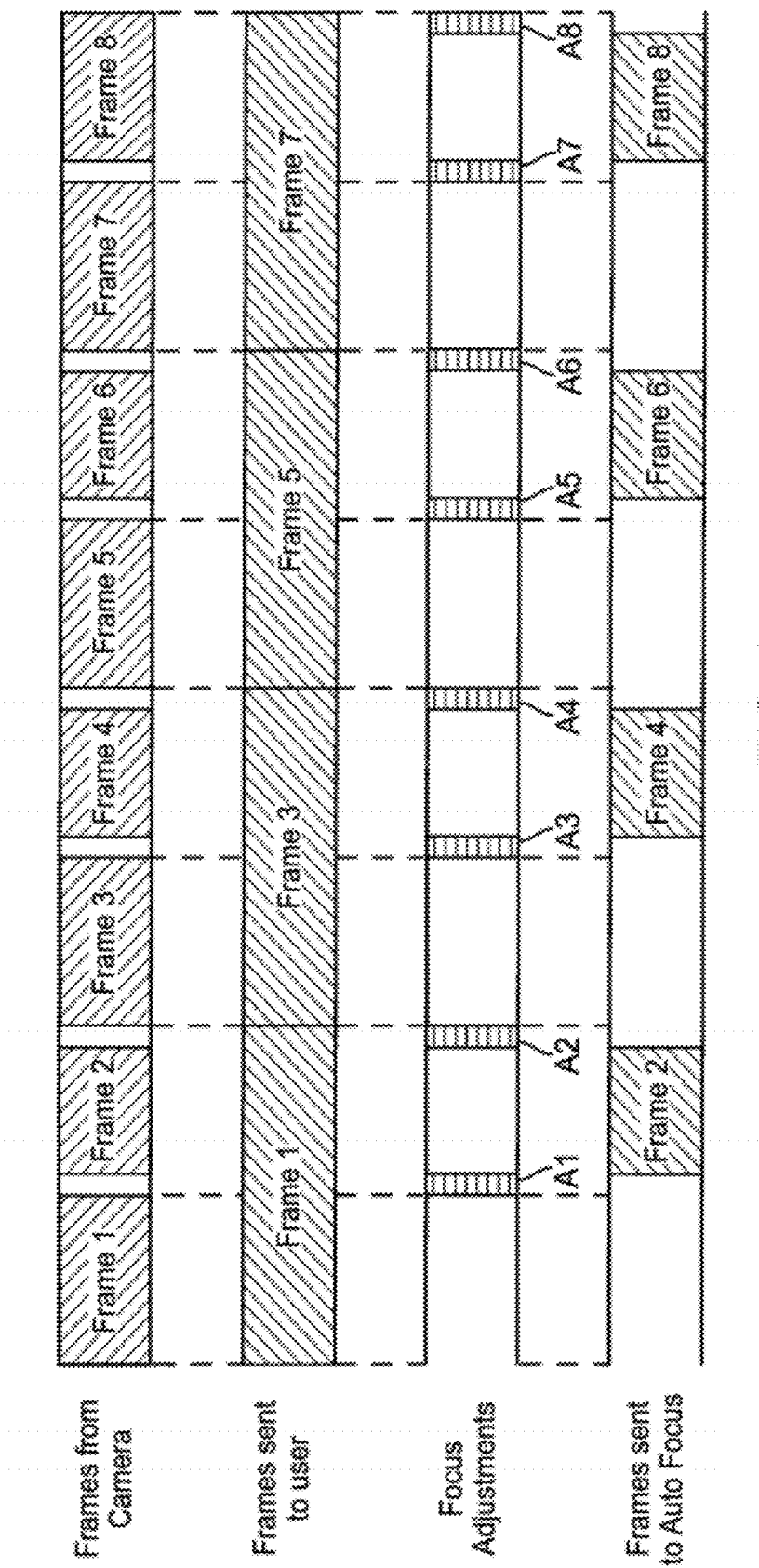

REAL TIME VIDEO FRAME MASKING AND PROCESSING FOR AUTO FOCUS AND OTHER QUALITY OPTIMIZATIONS

BACKGROUND OF THE INVENTION

The present invention relates to video cameras, and in particular to video cameras and web cameras with image sensors capable of operating at fixed or variable frame rates.

FIG. 1 is a diagram of a prior art conventional video processing scheme 100. Frames are sequentially received from an image sensor (not shown) at Receive Frame step 110. Each frame is then sent sequentially to Pixel Correction 120 where bad pixel information is used to correct for hot or dead pixels. From there the frame is sent to Auto Focus step 130 where the frame is analyzed to determine whether the lens (not shown) needs to be adjusted to achieve best focus. If Auto Focus step 130 determines that a lens adjustment is necessary, a feedback signal is sent to motors or actuators to adjust the focal position of the lens. From there the frame is sent to Color Processing 140. Color Processing 140 will analyze the frame to determine if any color corrections are necessary. Color corrections typically include gamma correction, white balance correction and exposure correction, however various other corrections can be made to optimize the color rendition of the frame at Color Processing 140. From there, the color corrected image is sent to Compression 150 where the frame is compressed or not. Finally, the frame is sent to Display 160. Display 160 will typically display the frame on a video monitor but can also record the frame on a recording device. Alternately, instead of a display, the video can be sent to an Instant Messaging application, uploaded to a web site, or otherwise transmitted.

From FIG. 1, it is clear that conventional video processing scheme 100 requires each frame to be individually analyzed and processed before it is displayed or recorded. Such analysis and processing is computationally intensive and requires one or more fast processors to achieve smooth, uninterrupted quality video. If any single frame is delayed in the video processing scheme 100, the resulting video can stall or appear to run it slow motion. Delays are therefore undesirable for quality video.

Additionally, Auto Focus step 130 is a recursive feedback process. Auto Focus step analyzes each frame for correct focus. If Auto Focus step 130 determines that the focus needs to be adjusted, it sends a command to the lens focus motors to adjust the lens for the subsequent frames. Each subsequent frame is then analyzed to determine if further adjustments are needed. Each time an adjustment is made, there is chance that the adjustment either overshoots or under shoots the correct focus position of the lens for a particular scene. In such cases, Auto Focus step 130 will determine that another adjustment is needed. The over shooting and under shooting of the correct focus position of the lens can will cause the resulting video image appear to oscillate in and out of focus. In many applications, the oscillation of the focus is distracting and undesirable.

In low-light conditions imaging and focus are even more difficult. Since most silicon based image sensors are highly sensitive to IR light, most contemporary video imaging applications use an IR filter to reduce the IR light and shape other spectral characteristics of the scene being imaged. As a result, some of the available light is lost. In normal lighting conditions, the reduction in brightness is only nominally detrimental to focusing and imaging a scene. However, when light levels are low, there can be very little information in the imaged scene for the auto focus routine and other image processing routines to analyze. The problems with oscillating focus described above are exacerbated and other image processing routines, such as color correction and noise reduction, are frustrated.

Thus, there is a need for inexpensive and reliable method, system and apparatus to automatically adjust focus and make other image qualities corrections in video cameras without interrupting the smooth appearance of quality video streams.

BRIEF SUMMARY OF THE INVENTION

The present invention provides a system and method for splitting a video stream from a high frame rate image sensor. One of the video streams is used for processing to adjust a quality of the video stream. The other video stream is presented to a user application. In one embodiment, every other frame is processed, while the remaining frames are sent to the user application. The processing of the frames not received by the user application can be done in a device providing the frames (camera), a PC host, or elsewhere.

In one embodiment, the method of the invention transparently optimizes the auto focus routine. Auto focus routines are run on data from alternating images in a video stream. During the frames in which the auto focus routines are running, an alternate frame is shown to the user so that the typical oscillations in and out of focus are not seen by the user.

In particular, in one embodiment, while a first frame is shown to a user, a second frame is captured. During the time in which the second frame is captured, the lens in front of the sensor is adjusted from a default position, the sharpness of the image is analyzed to determine the status of the focus while the lens is stationary, and then the lens is moved back to the default position. This routine is repeated until a best focus is achieved and the lens is set to a new default position for subsequent images sent to the user.

In one embodiment, a filter wheel and a switch are used to split the video stream into alternate frames captured with and without an IR filter. The "switch" in one embodiment is a software switch in the computer which directs different frames to different destinations to split the video stream. The frames without the IR filter are used to enhance the detail of the low-light scenes based on the extra data collected in the IR region of the scene. The video stream is either sent to a user as alternating frames of the scene captured with and without the IR data or the frames captured without the IR filter are processed and included in an image channel of the frames captured with the IR filter. The IR data can be included in the luminance channel.

In one embodiment, a device (e.g., camera) sends compressed video, which has some interleaved frames decompressed and processed according to the invention. The other, compressed frames, can be sent directly to the user application, such as to an Internet web site, where the user application can handle the decompression.

BRIEF DESCRIPTION OF THE DRAWINGS

FIG. 3 is timing diagram of an auto focus routine using alternating frames from a single image sensor according to one embodiment of the present invention.

DETAILED DESCRIPTION OF THE INVENTION

Many contemporary conventional video cameras use image sensors, such as CMOS and CCD sensors, that offer high-resolution video streams with frame rates higher than required for quality video. Many sensors are capable of frame rates of 60 frames per second or higher whereas quality video can be achieved with around 30 frames per second and lower. Such high frame rates provide the flexibility to sample and process frames without interrupting the flow of frames to a user or an external application. Alternating frames can be subjected to different exposure conditions and settings for determining and processing various types of image optimizations and enhancements.

Figure 1:
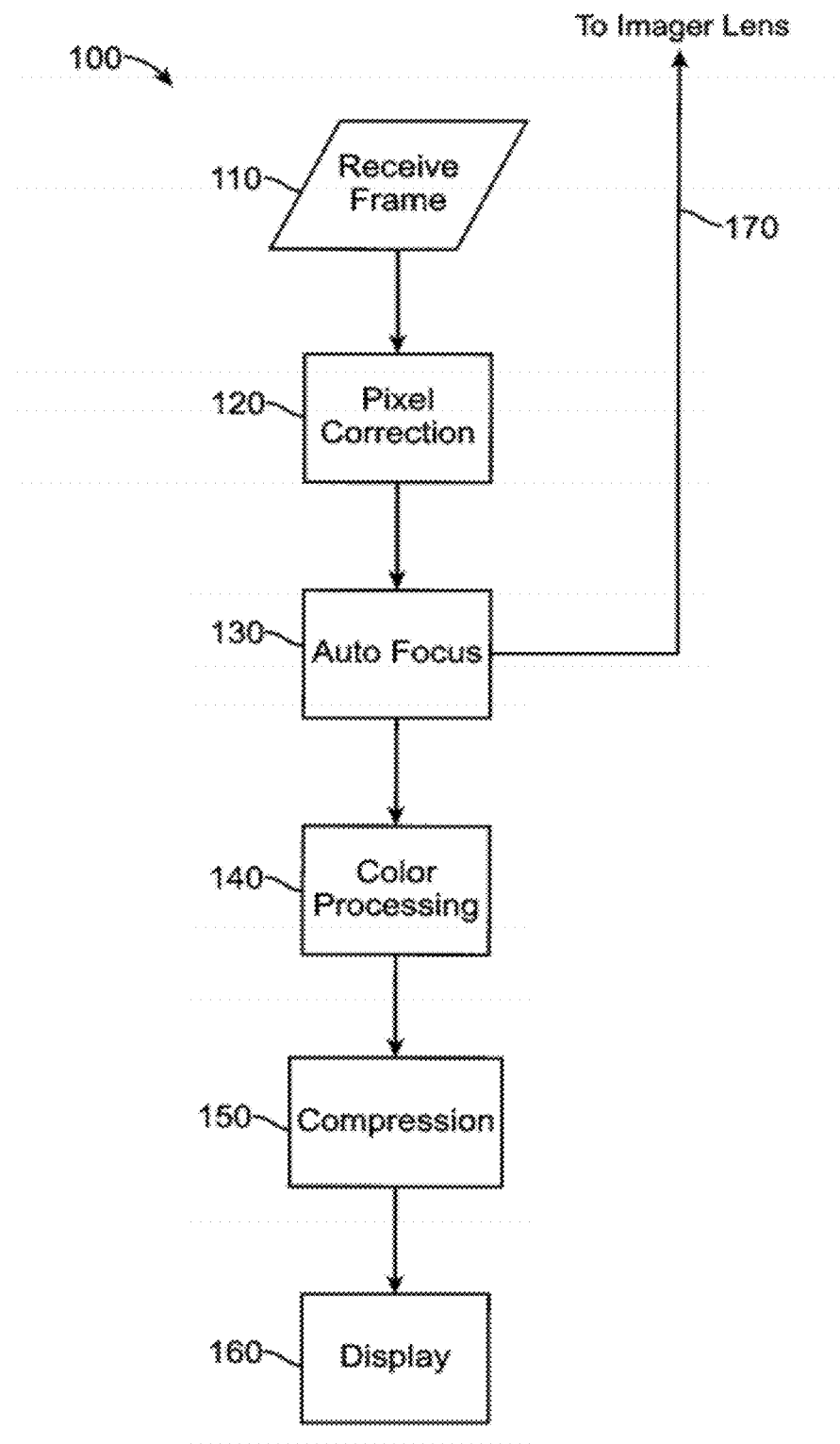
FIG. 1 is schematic of a prior art video processing scheme with an auto focus routine.
Figure 2:
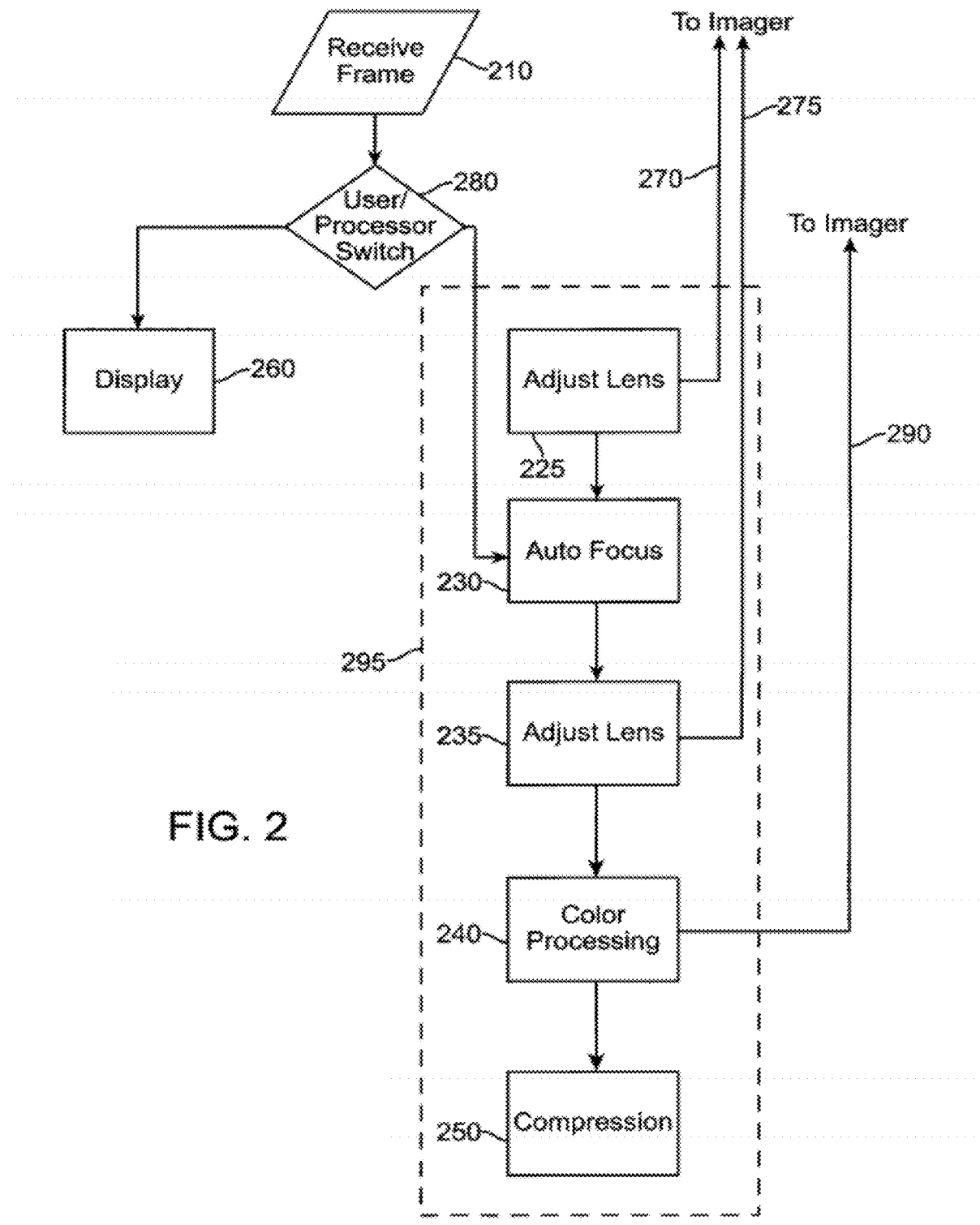
FIG. 2 is a schematic of a system using alternating frames from a single image sensor to execute an auto focus routine according to one embodiment of the present invention.

FIG. 2 is a diagram of a system according to one embodiment of the present invention that provides for uninterrupted delivery of video streams to a user while also providing for real time adjustment of focus and image correction. Each frame from an image sensor is received at Receive Frame 210. Then, depending on the settings of User/Processor Switch 280, the frame is sent either directly to the Display 260 or to image processing 295. In one embodiment of the present invention, the User/Processor Switch 280 sends every other frame to Display 260 and every other frame to image processing routine 295. In a system using an image sensor that operates at 60 frames per second, this means that the Display 260 can still receive frames at 30 frames per second.

Depending on the application, the invention can provide various frame rates. Some applications use video streaming at or above 30 fps. The technique of the present invention can also be applied for lower frame rates. For example, most of the IM applications send video streams at 15 fps. This technique would also benefit such applications, and can be used with an older sensor that provides a 30 fps rate (a 60 fps rate is not required). The extra frames are used to analyze the video stream that are not displayed to the user can be done only every third or fourth frame (even less). One could have a camera running at 30 fps and use 6 fps to process the data leaving 24 fps for the user, like a motion picture, for example.

The ratio of images sent to the Display 260 and to image processing routine 295 can be adjusted to optimize Auto Focus step performance or user experience. For example, User/Processor Switch 280 can be programmed to send every third, fourth or fifth frame to image processing routine 295. The ratio can be higher for the initial adjustment (e.g., every other frame is processed), and can be lower for subsequent adjustments (e.g., every tenth frame for fine tuning once a coarse adjustment is achieved).

Frames sent for analysis and processing in routine 295 are measured and quantified according to various metrics. According to one embodiment, processing routine 295 includes Auto Focus step 230, Color Processing 240 and Compression 250. In other embodiments, other analysis may be added to processing routine 295 and the steps shown in FIG. 2 may be omitted or the order in which the steps are executed may be rearranged.

Before frames are sent to image processing routine 295, Adjust Lens step 225 sends a signal 270 to the imager lens to move. Once the lens is in position, a frame is sent to Auto Focus step 230. Auto Focus step 230 analyzes the sharpness of the frame to determine if it is in best focus. Once Auto Focus step 230 has completed its analysis, Adjust Lens 235 sends a signal 275 to the imager to move the lens back to is original position before capturing another frame to send to Display 260. Before the next frame is sent to image processing 295, Adjust Lens 225 sends another signal 275 to the imager lens to move to another position and the process is repeated. This iterative process continuously looks at each frame sent to image processing 295 to make sure the lens in front of the image sensor is adjusted for best focus. Once Auto Focus step 230 finds the lens position of best focus, it will send a signal to the imager to keep the lens in that position for subsequent frames sent to Display 260 so that frames viewed by a user are in focus. This process is described in more detail below in reference to FIG. 3.

After the imager lens is adjusted and Auto Focus step has run its analysis, each frame sent to image processing 295 can be analyzed by Color Processing 240. Based on the results of Color Processing, signals 290 are sent to the imager to set chip level channel biases, gain voltages and other chip level settings to correct for image quality of subsequent frames. Finally, Compression 250 applies an appropriate level of compression to the frame according to the requirements of a particular application.

FIG. 3 is a timing diagram according to one embodiment of the present invention. Frames from the camera are captured sequentially. In this example, every other frame is sent to the user and maintained for the duration of two camera frames. In particular, Frame 1 is sent to the user for the time that takes the camera to capture Frames 1 and 2, Frame 3 is sent to the use for the time is takes the camera to capture Frames 3 and 4 and so on. At the beginning of Frame 2, focus adjustments are made during period A1. Once the lens has fully moved into position and stopped, the portion of Frame 2 captured between A1 and A2 is sent to Auto Focus step. Auto Focus step checks the sharpness of the frame to determine if the frame is in focus. After Auto Focus step is done with Frame 2, during A2, the lens is adjusted back to the position it was in before adjustment A1. In period A3 the lens is adjusted to another position. Auto Focus step analyzes Frame 4 for sharpness while Frame 3 is being shown to the user. Once Auto Focus step determines the lens position of best focus, it will send a signal to the imager to keep the lens in the position of best focus for subsequent frames sent to the user. For example, such a signal could occur during A2, A4, A6, A8 or other subsequent post Auto Focus step analysis period.

Thus, adjustments are performed and tested before any movement of the autofocus lens that would affect the images seen by the user application. By using a beginning and end of the processing frames to first move the lens, then move it back, the adjustment can be tested to see if it makes the focus better before actually implementing it on the live video provided to the user application.

Figure 4B:
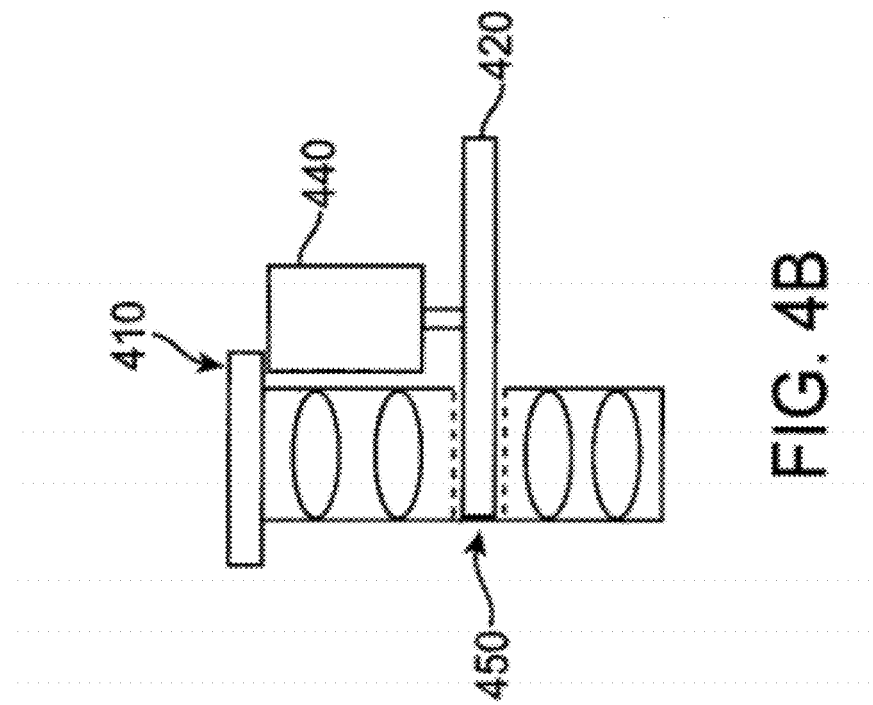
FIGS. 4A and 4B is schematic diagram of top and side views of an apparatus for splitting a video stream into multiple streams with different spectral response characteristics for optimizing video in low light conditions according to one embodiment of the present invention.
Figure 4A:
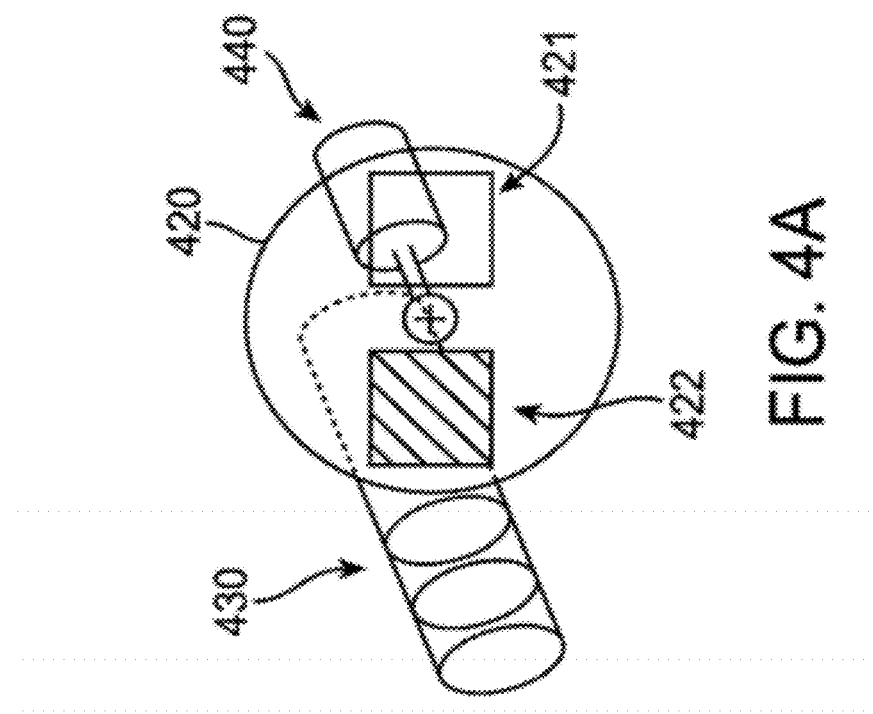

FIGS. 4A and 4B are top and side views of a schematic diagram of an apparatus for optimizing image quality in low-light and bright light conditions according to one embodiment of the present invention. Sensor 410 is a silicon based image sensor and operates at 60 fps. Filter wheel 420 is rotated by motor 440 at a rate so each frame is imaged alternately through hole 421 or IR filter 422. Every other frame is captured either with the IR filter 422 or the hole 421 in the optical path of lens stack 430 in front of sensor 410. In low light conditions, the additional data collected in the frames captured with the IR filter can be used to augment or enhance the frames captured without the IR filter.

By splitting the video stream of a high-frame-rate image sensor, information from different aspects of a scene's spectral characteristics can be captured, analyzed and processed into a composite optimized image. Appropriate image processing can be used to combine the two streams of data and offer an enhanced image so that colors are accurate while details from the IR portion of the scene can be integrated into one of the video stream's image channels such as the luminance channel.

Alternatively, the video stream is simply the composite of alternating frames with different spectral response characteristics achieved by synchronizing a filter wheel to move filters in an out of position for successive frames of the video stream. The video stream can then be displayed to a user or sent on for more processing depending on the particular application. It is also possible to use the frames captured without the IR filter to assist in auto focusing the video stream. Since there can be more detail in the IR portion of a scene's spectral characteristics, the high IR frames can be analyzed to determine best focus for subsequent filtered frames.

Since silicon based sensors, such as CMOS sensor and CCD sensors, are typically very sensitive to IR light, specialized IR filters are used to either block or shape the spectrum to help reproduce colors accurately. However, when the light levels are low, the detail of the image can be enhanced by including the data from the IR portion of the scene imaged. The IR portion of the scene is imaged through IR filter 422 and will often show more detail in a low light scene due to the silicon based image sensor's high sensitivity to IR light. However, when light levels are such that the extra detail exposed by the IR portion of the scene is not necessary, Filter Wheel 420 can be stopped so that the FR filter is stationary and remains outside the optical path of lens stack 430 to provide for the best color reproduction. Alternatively, the rate at which filter wheel 420 is rotated can be varied so that every $n^{th}$ frame is imaged through hole 421 with no IR filter to capture and incorporate the extra IR data into the video stream at only every $n^{th}$ frame. By combining a frame having IR information and a frame captured at a close interval without the IR contents, the host PC can improve the image quality (independent of the autofocus processing).

Figure 5:
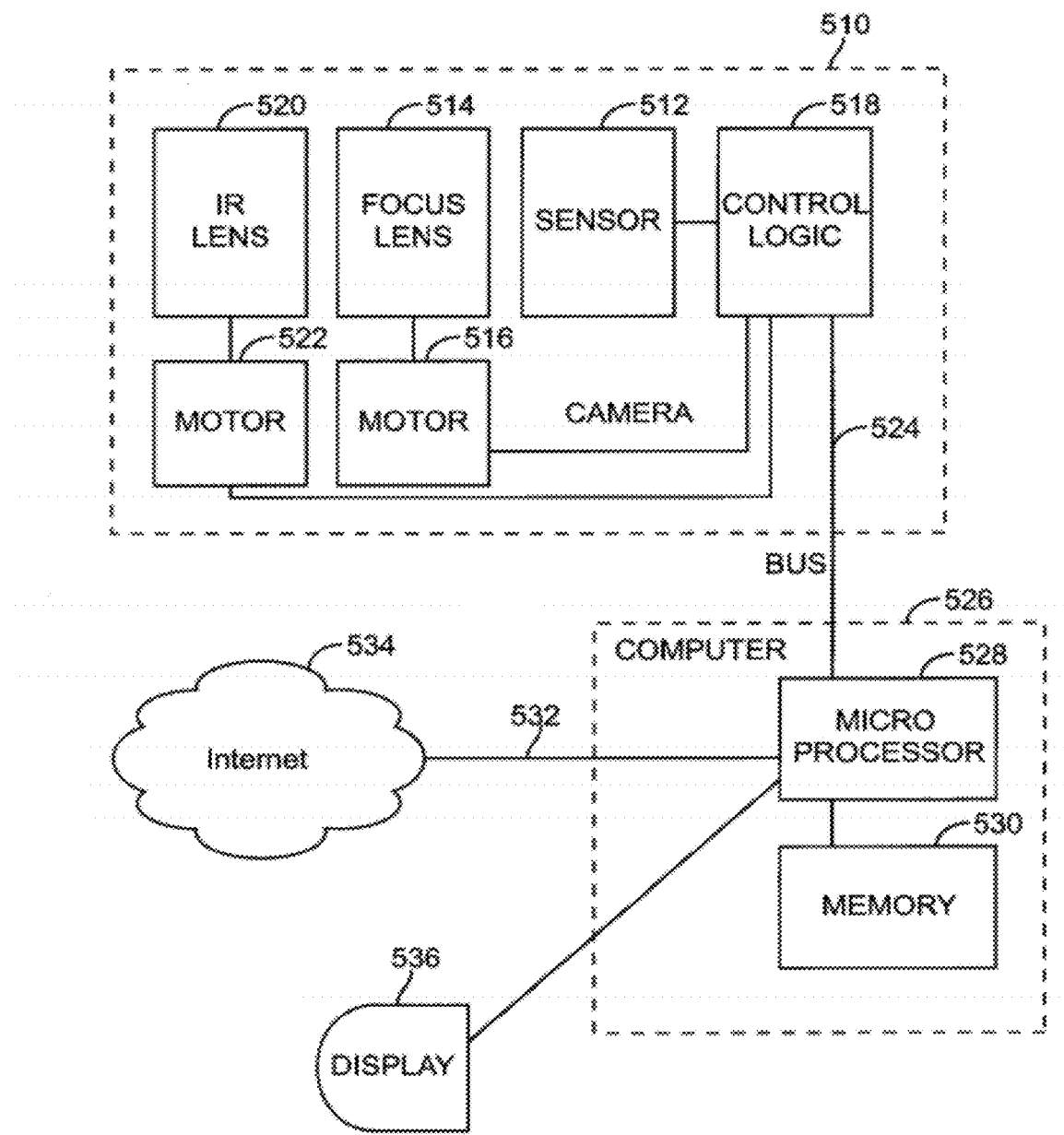
FIG. 5 is a block diagram of a system incorporating the present invention.

FIG. 5 is a diagram of a system incorporating and embodiment of the present invention. A camera 510 includes an image sensor 512. A focus lens 514 is controlled by a motor 516. Motor 516 is controlled by control logic 518. In one embodiment, and IR lens 520 is included instead of, or in addition to, focus lens 514. IR lens 520 is controlled by a motor 522, under control of control logic 518. Images from sensor 512 are preprocessed by control logic 518 and sent over a bus (or wireless link) 524 to a computer 526.

Computer 526 performs the splitting of the video and the processing described above, using a microprocessor 528 and memory 530. Every other frame is sent, in one embodiment, to Internet 534 over a wired or wireless communication link 532, such as by being part of a instant messaging application. Alternately, or in addition, the frames can be sent to a local display 536. The other, interleaved frames are stored in memory 530 and processed by microprocessor 528.

It is to be understood that the examples and embodiments described above are for illustrative purposes only and that various modifications or changes in light thereof will be suggested to persons skilled in the art and are to be included within the spirit and purview of this application and scope of the appended claims. For example, in FIG. 4, Filter Wheel 420 can be used to hold three or more different filters or the rate at which Filter Wheel 420 is rotated can be varied such that every $n^{th}$ frame is imaged through Hole 421. Alternately, a stationary filter that is activated by the application of an electric field can be used, such as a polarizing filter. The processing done on the video stream (whether it's for autofocus, compression or image quality improvement through IR processing) may or may not happen at the device level. The invention allows for a low cost device while the host (PC, MAC) does the heavy processing of the pre-formatted stream. Therefore, the above description should not be understood as limiting the scope of the invention as defined by the claims.

What is claimed is:

1. A method for optimizing a video stream comprising:
   receiving a video stream at a frame rate in excess of a frame rate required for a user application;
   splitting the video stream into a plurality of split video streams including at least a first split video stream with first frames and a second split video stream with second frames not including the first frames;
   processing the first split video stream to adjust a quality of said video stream; and
   providing the second split video stream to a user application;
   wherein said processing further comprises adjusting the focus of at least one of the first and second split video streams, wherein said adjusting the focus of at least one of the first and second split video streams comprises moving a lens from a first position after one of the second frames in the second split video stream to a second position and moving the lens back to the first position before any other second frame follows in the second split video stream.

2. The method of claim 1 further comprising, providing various frame rates of the second split video stream depending on the user application.

3. The method of claim 1 wherein said processing is done in a host, separate from a device providing said video stream.

4. The method of claim 1 wherein said user application comprises an instant messaging application.

5. The method of claim 1 wherein said processing comprises analyzing the sharpness of one of the first and second split video streams.

6. The method of claim 1 wherein said splitting comprises imaging one of the first and second split video streams through an optical filter and imaging the other of the first and second split video streams in the absence of said filter.

7. The method of claim 6 further comprising enhancing an image detail associated with the second split video stream by selectively incorporating data from the first split video stream into the data of the second split video stream depending on a light condition.

8. The method of claim 6 wherein said processing comprises combining the first split video stream with the second split video stream.

9. The method of claim 6 wherein said filter is an IR filter and mounted in a filter wheel.

10. The method of claim 1 wherein the received video stream is compressed, and further comprising:
    decompressing the first split video stream before said processing to adjust a quality of said received video stream; and
    providing second split video stream as a compressed video stream to the user application.

11. The method of claim 1, further comprises adjusting the focus of the received video stream by testing a lens adjustment using the first split video stream before implementing the lens adjustment to the second split video stream.

12. The method of claim 1, further comprising, adjusting a ratio of the second frames to the first frames.

13. A system for optimizing a video stream provided to an application comprising:
    an image sensor for producing a source video stream;
    a lens mounted in front of said image sensor;

control logic configured to control optimization of the quality of said source video stream;

an image processor; and a switch configured to receive said source video stream from said sensor and to send a first split video stream including first frames to said image processor and a second split video stream including second frames to the application;

wherein said image processor performs analysis based on the first split video stream to optimize the quality of said source video stream and provides a feedback signal to said control logic, and wherein said image processor comprises a lens adjust module and an auto focus module, wherein said lens adjust module is configured to adjust the lens from a first position to an adjusted position after one of the second frames in the second split video stream, and to adjust the lens back from the adjusted position to the first position before any other second frame follows in the second split video stream.

14. The system of claim 13 further comprising an optical filter, wherein one of said first and second split video streams is imaged through said optical filter and the other of said first and second split video streams is imaged without said optical filter.

15. The system of claim 14 wherein said image processor is further configured to enhance an image detail associated with the second split video stream by selectively incorporating data from the first split video stream into the data of the second split video stream depending on a light condition.

16. The system of claim 14 wherein said image processor alternates frames from said first video stream and said second video stream to create a composite video and send said composite video stream to the application.

17. The system of claim 16 wherein said user the application comprises a digital recording device.

18. The system of claim 13 wherein the first split video stream is analyzed by said auto focus module.

19. The system of claim 13, wherein said switch is configured to adjust a ratio of the second frames to the first frames.

20. A system for optimizing a video stream comprising:

an image sensor for producing a source video stream;

a lens mounted in front of said image sensor;

control logic configured to control optimization of the quality of said source video stream;

media with computer readable code implementing a user application utilizing video;

an image processor;

a switch configured to receive said source video stream from said sensor and to send a first split video stream including first frames to said image processor and a second split video stream including second frames to said user application; and an auto focus module, wherein said auto focus module is configured to adjust the lens from a first position to an adjusted position after one of the second frames in the second split video stream, and to adjust the lens back from the adjusted position to the first position before any other second frame follows in the second split video stream, and wherein said image processor performs analysis based on the first split video stream to optimize the quality of said source video stream and provides a feedback signal to said control logic.

* * * * *